United States Patent
Watanabe

(10) Patent No.: US 7,201,996 B1
(45) Date of Patent: Apr. 10, 2007

(54) SOUND GENERATOR FOR A PORTABLE DEVICE

(75) Inventor: Keita Watanabe, Fujiyoshida (JP)

(73) Assignee: Citizen Electronics Co., Ltd., Fujiyoshida-shi (JP)

( * ) Notice: Subject to any disclaimer, the term of this patent is extended or adjusted under 35 U.S.C. 154(b) by 1090 days.

(21) Appl. No.: 09/592,791

(22) Filed: Jun. 13, 2000

(30) Foreign Application Priority Data

Jun. 15, 1999 (JP) .................. 11-168952

(51) Int. Cl.
*H01M 2/10* (2006.01)
*H04R 25/00* (2006.01)
*H04R 1/02* (2006.01)
*G08B 3/00* (2006.01)
*G08B 3/19* (2006.01)
*H03G 3/00* (2006.01)

(52) U.S. Cl. ................. 429/99; 429/96; 429/98; 340/388.1; 340/384.6; 340/391.1; 381/190; 381/386

(58) Field of Classification Search ............... 381/61, 381/315, 409, 410, 190, 392, 386; 340/396.1, 340/384.1, 393.2, 393.3, 384.4, 7.6, 7.63, 340/388.1, 384.6; 429/96–100, 128, 123, 429/146; D14/222

See application file for complete search history.

(56) References Cited

U.S. PATENT DOCUMENTS

| | | | | |
|---|---|---|---|---|
| 2,985,705 A | * | 5/1961 | Smythe | 429/98 |
| 3,858,389 A | * | 1/1975 | Isuruishi | 368/245 |
| 4,004,409 A | * | 1/1977 | Ganter et al. | 368/255 |
| 4,115,770 A | * | 9/1978 | Kanazawa | 340/392.3 |
| 4,251,604 A | * | 2/1981 | Umemoto | 429/98 |
| 4,276,627 A | * | 6/1981 | Komiyama | 368/84 |
| 4,362,396 A | * | 12/1982 | Perrot | 368/203 |
| 4,478,524 A | * | 10/1984 | Saitoh et al. | 368/204 |
| 4,511,260 A | * | 4/1985 | Pasquier | 368/69 |
| 4,726,661 A | * | 2/1988 | Parker | 349/199 |
| 4,973,941 A | * | 11/1990 | Davis et al. | 340/384.7 |
| 5,296,839 A | * | 3/1994 | Lu | 340/384.6 |
| 5,392,455 A | * | 2/1995 | Benoist et al. | 340/7.62 |
| 5,537,472 A | * | 7/1996 | Estevez-Alcolado et al. | 379/433.02 |
| 5,668,423 A | * | 9/1997 | You et al. | 310/81 |
| 5,719,549 A | * | 2/1998 | Lai | 340/384.73 |
| 5,844,484 A | * | 12/1998 | Fujiuchi et al. | 340/572.1 |
| 5,861,686 A | * | 1/1999 | Lee | 310/36 |
| 5,867,090 A | * | 2/1999 | Chen | 340/388.1 |
| 6,208,238 B1 | * | 3/2001 | Ohta | 340/391.1 |

\* cited by examiner

*Primary Examiner*—Vivian Chin
*Assistant Examiner*—Devona E. Faulk
(74) *Attorney, Agent, or Firm*—Birch, Stewart, Kolasch & Birch, LLP

(57) ABSTRACT

A sound generating device is mounted in a recess formed in a case, and a battery is mounted on the case. A pair of terminals are provided on the underside of the case. A pair of leads connect a pair of electrodes of the battery with the terminals.

8 Claims, 5 Drawing Sheets

SOUND GENERATOR FOR A PORTABLE DEVICE

BACKGROUND OF THE INVENTION

The present invention relates to a buzzer for a portable communication device such as a portable telephone and a beeper.

The portable communication device is operated by the power of a storage battery as a main source of electricity having a large capacity under normal conditions. In such a device, it is necessary to provide a backup source for preventing a memory from erasing data such as telephone numbers stored therein, if the voltage of the main source, or the main source is cut off. In addition, it is necessary to provide an auxiliary source to operate a buzzer even if the main source is cut off.

As an auxiliary source, a disk type small battery is used. On the other hand, as a sound source for calling sound and a warning sound of the portable communication device, a very small buzzer is used.

In general, the auxiliary battery is mounted on a source portion of a substrate, and the buzzer is attached to a position necessary for the portable communication device, which positions have no relation with each other.

Referring to FIG. 7 showing a prior art, a buzzer 21 is disposed on a substrate (not shown) regardless of a battery 22. The battery 22 is set in an insulation case 23 mounted on the substrate. The battery is connected to a control circuit for a memory and the buzzer through contact plates 24 and 25 connected to a circuit on the substrate. The battery is a storage battery charged at the same time as the charging of the main battery, and provided as a backup battery or a source for the buzzer.

In the prior art, since the battery and the buzzer are independently disposed, it is necessary to form a space on the substrate for mounting the battery, resulting in increasing of the size of the substrate and hence the size of the portable communication device.

Furthermore, the buzzer 21 and the case 23 for the battery 22 are manufactured in separate manufacturing processes, which causes the manufacturing and assembling costs to increase.

SUMMARY OF THE INVENTION

An object of the present invention is to provide a sound generator having a battery which may be decreased in size and manufactured at a low cost.

According to the present invention, there is provided a sound generator for a portable device comprising, a case, a sound generating device mounted in the case, a battery mounted on the case, terminals provided on the case, a pair of leads connecting a pair of electrodes of the battery with the terminals.

The case has a recess on an outside wall thereof, and the sound generating device is mounted in the case.

Each of the leads comprises a resilient contact plate contacted with the corresponding electrode.

The sound generating device may be a buzzer.

The battery has an upper electrode and lower electrode.

The terminals comprise a pair of terminals for applying a voltage of the battery to a control circuit, and a pair of terminals for applying a voltage from the control circuit to the buzzer for operating it.

The battery is held by the contact plate engaged with the upper electrodes.

The contact plate holding the battery is offset.

DETAILED DESCRIPTION OF THE PREFERRED EMBODIMENT

Figure 1:
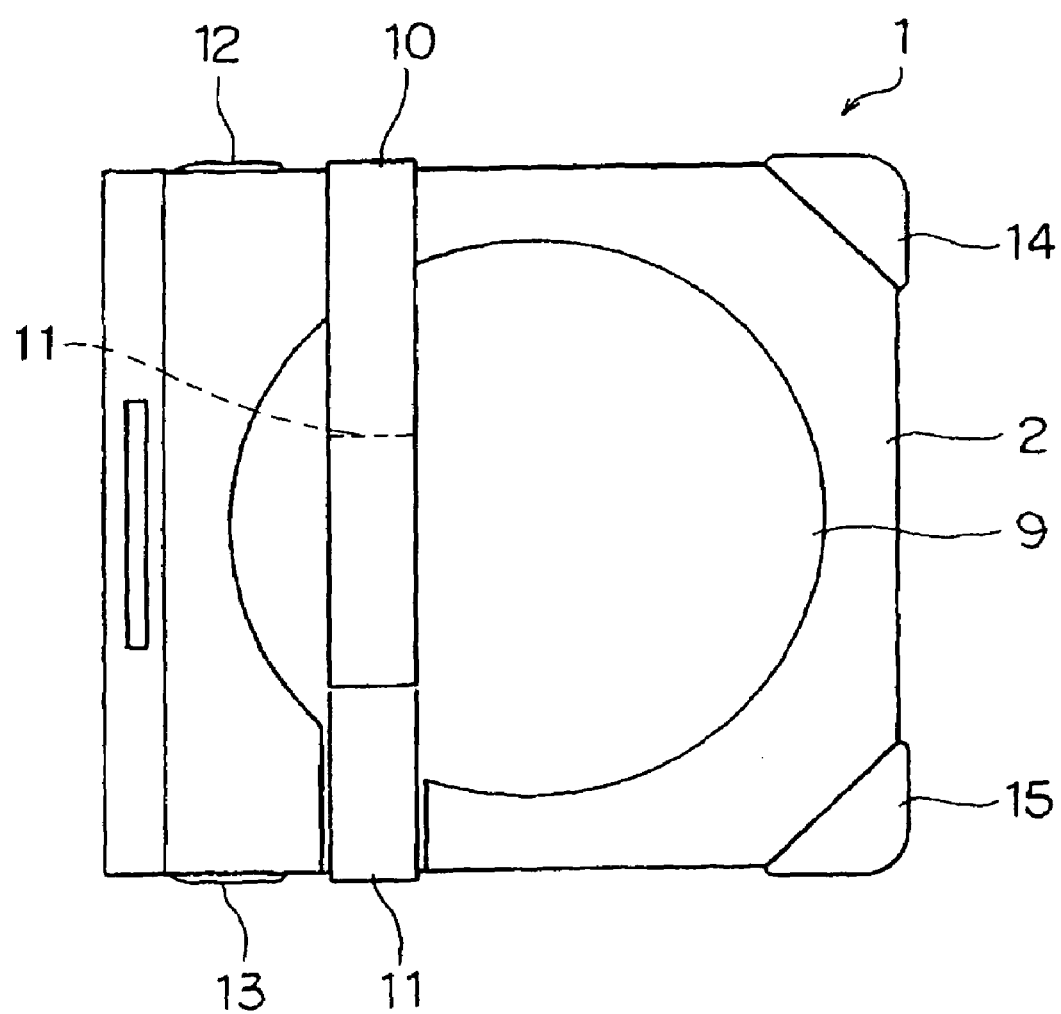
FIG. 1 is a plan view of a sound generator according to the present invention.
Figure 2:
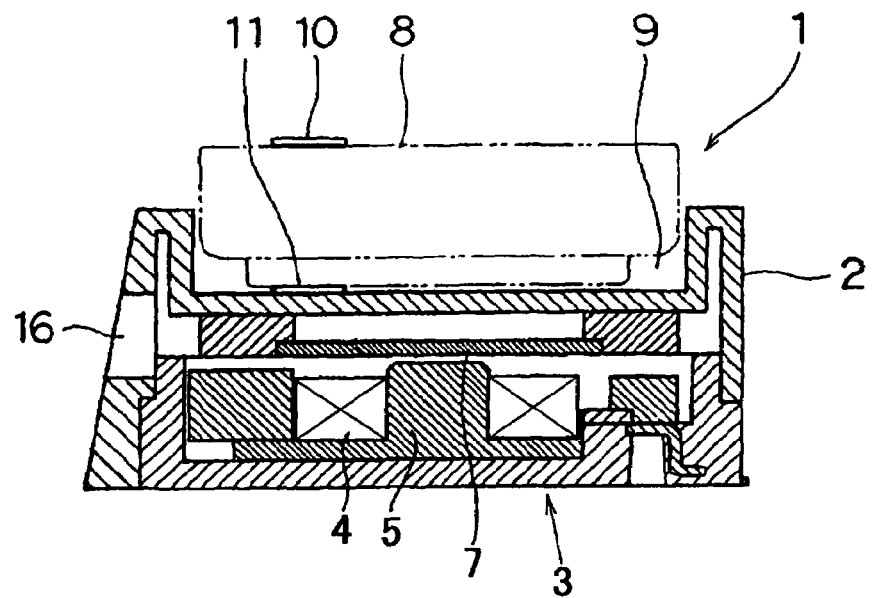
FIG. 2 is a sectional side view of the sound generator.

Referring to FIGS. 1 and 2, a sound generator 1 according to the present invention comprises a case 2 made of plastic, a buzzer 3 mounted in the case 2, and a disc type small battery 8 attached on the case 2, so as to expose the battery. The buzzer 3 as a sound generating device comprises a coil 4, a core 5 and an armature 7. An electronic current is supplies to the coil from a control circuit (not shown) to generate a buzzing sound.

Figure 4:
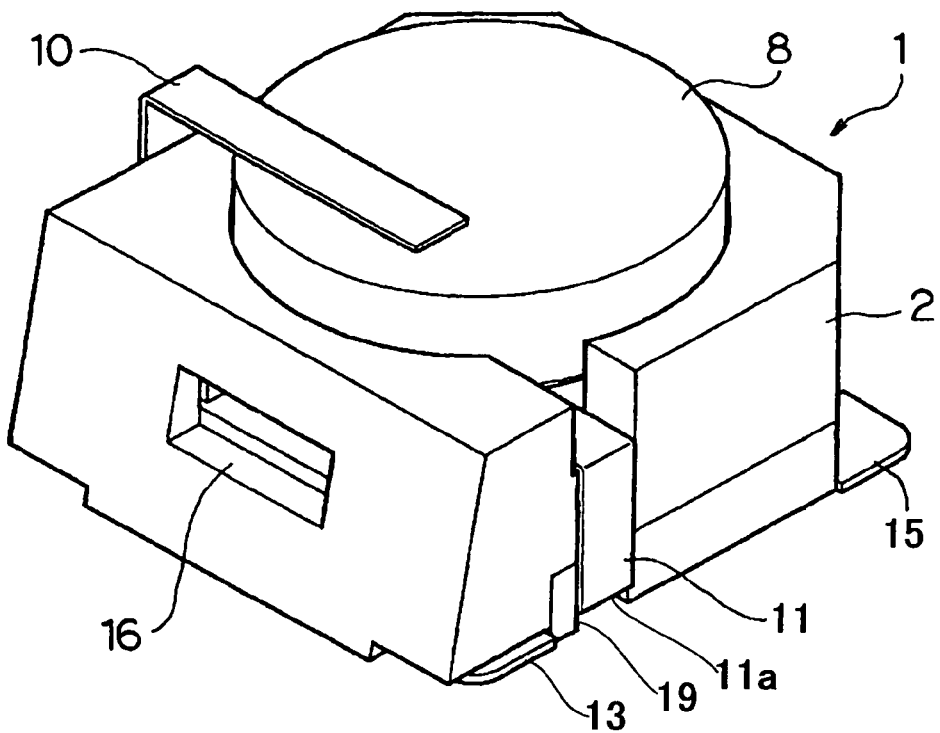
FIG. 4 is a perspective view.

On the case 2, a circular recess 9 is formed as shown in FIG. 4. The small battery 8 has a positive electrode on the upper side thereof and a negative electrode on the underside thereof. Resilient metallic contact plates 10 and 11 are negative electrode. The battery 8 is resiliently held by the elasticity of the contact plate 10. In order to facilitate to detach the battery 8 from the case 2, the contact plate 10 is offset as shown in FIG. 4.

Figure 3:
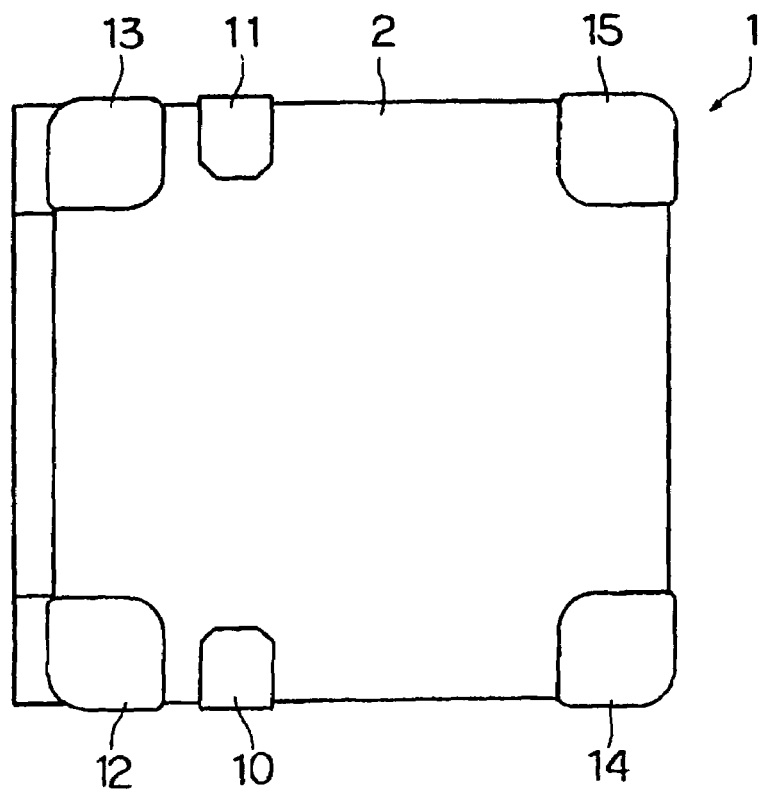
FIG. 3 shows the underside of the sound generator.

As shown in FIG. 3, the contact plates 10 and 11 are extended to the underside of the case 2 and bent on the underside. On the underside of the case 2, four connecting terminals 12, 13, 14, and 15 are attached at four corners. Each of the terminals 12 through 15 comprises a flat metal plate. The contact plates 10 and 11 are connected to two terminals 12 and 13.

Figure 5:
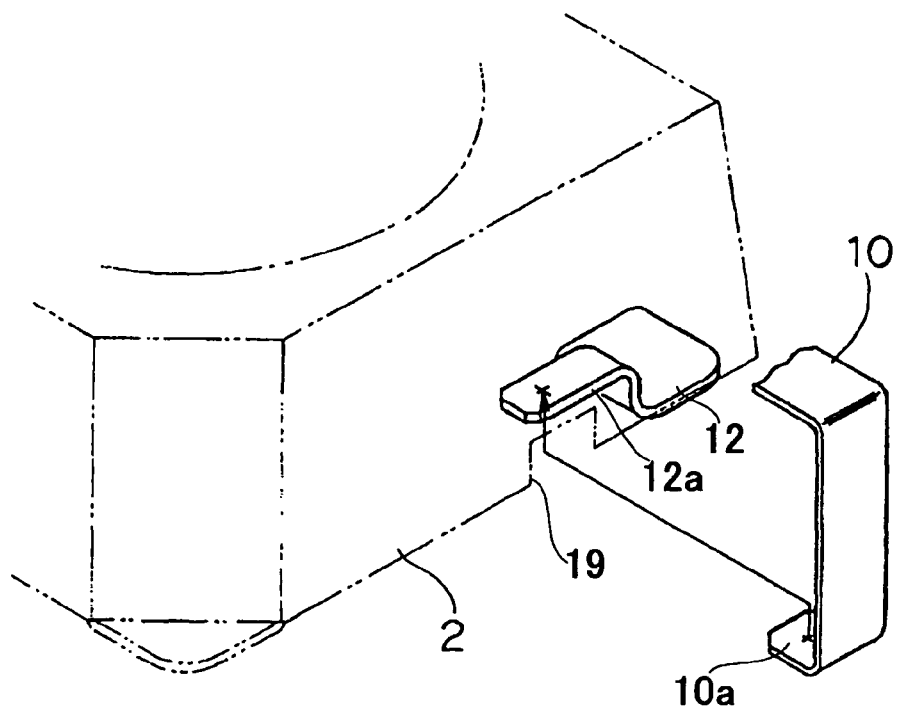
FIG. 5 is an explode perspective view.

More particularly, each of bent portions 10a and 11a of the contact plates 10 and 11 are engaged with a groove 19 formed in the underside of the case 2 as shown in FIGS. 4 and 5. Each of the terminals 12 and 13 is upwardly bent in an inverted L-shape to form a connecting end 12a as shown in FIG. 5. The bent portion 10a (11a) is connected with the connecting end 12a by welding. Thus, the contact plates 10 and 11 are electrically connected with the terminals 12 and 13. The terminals 14 and 15 are connected to the coil 4. Furthermore, the case 2 has a sound discharge hole 16.

The sound generator 1 is mounted on a printed circuit (not shown). The terminals 12, 13, 14 and 15 are connected to corresponding terminals of the control circuit, thereby applying a voltage to the control circuit from the battery 8 through the contact plates 10 and 11 and terminals 12 and 13. A control signal is applied to the buzzer 3 from the control circuit through the terminals 14 and 15, so that a buzzing sound emanates from the sound discharge hole 16.

Although the contact plates 10 and 11 and the terminals 12 and 13 are separately made, each couple the contact plate 10 and terminal 12, and contact plate 11 and terminal 13 may be made by a single plate.

Figure 6:
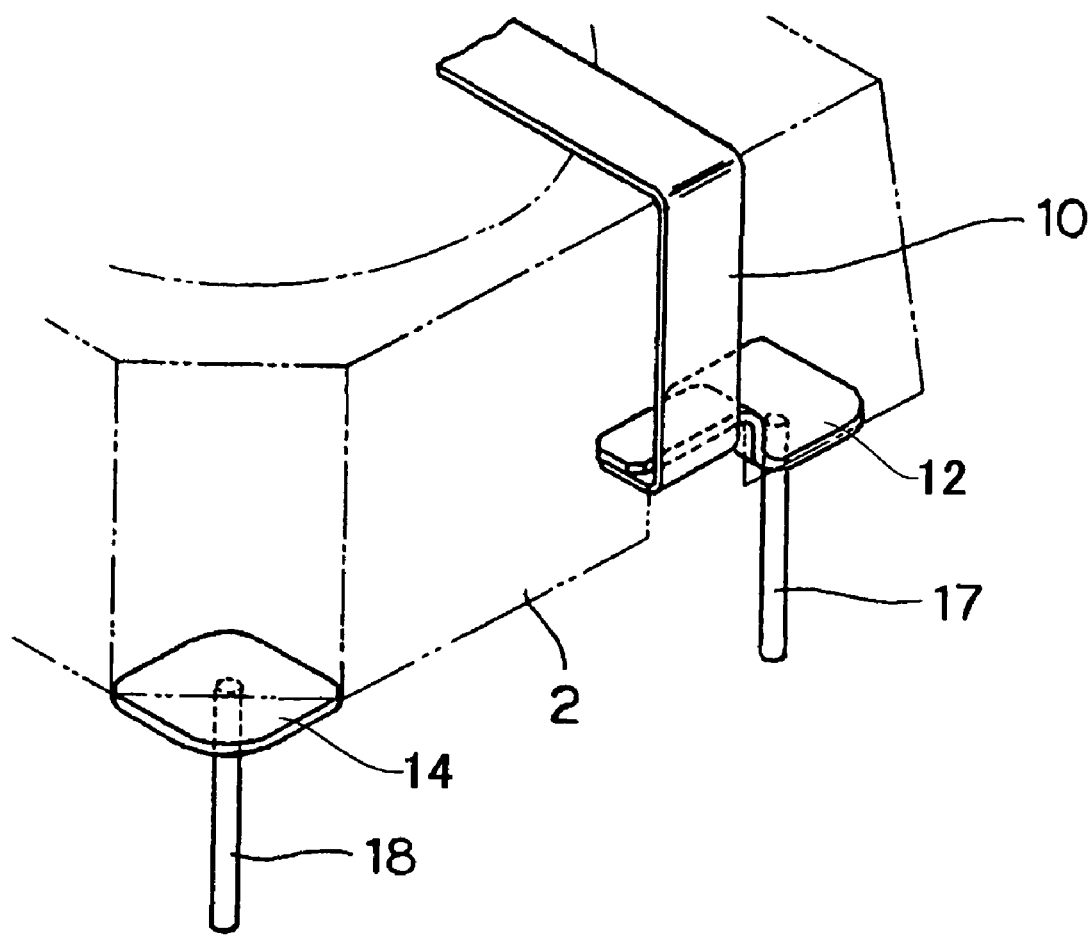
FIG. 6 is perspective view showing a modification of terminals.
Figure 7:
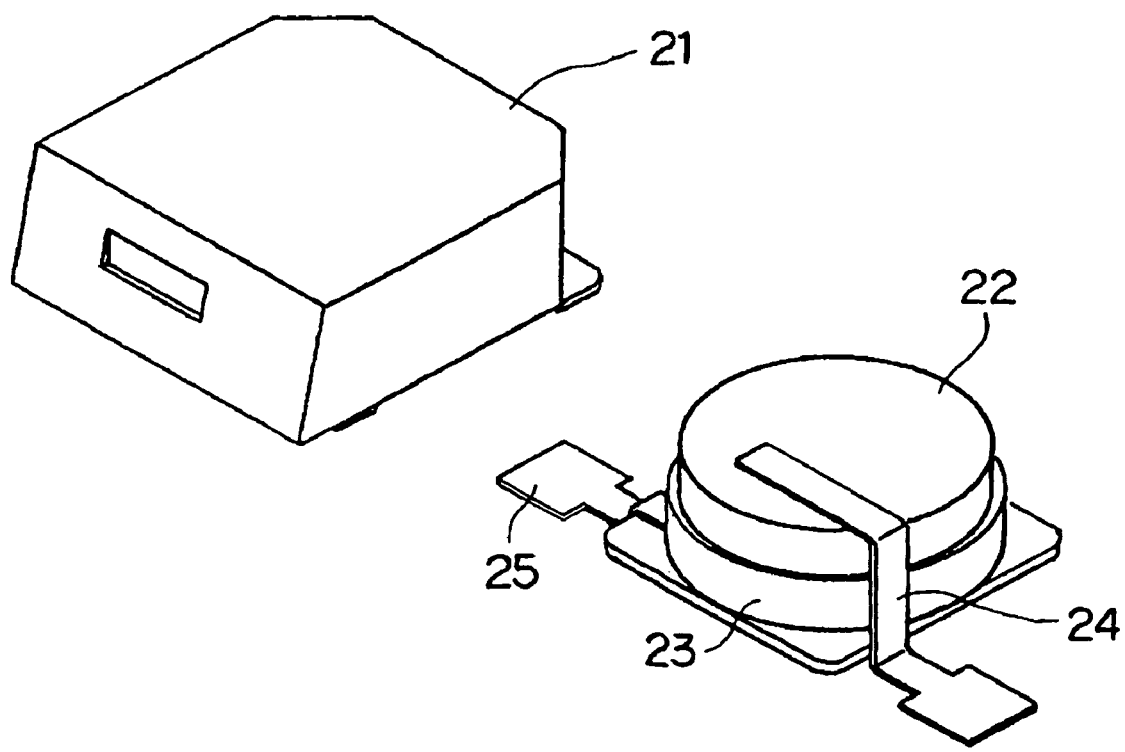
FIG. 7 is a perspective view of a conventional sound generator.

FIG. 6 is a perspective view showing a modification of the device. Lead wires 17 and 18 are vertically connected to the terminals 12 through 15. The wires are inserted in corresponding holes formed in a circuit board and bent on the underside of the circuit board, thereby connecting each terminal with a corresponding terminal of the circuit.

In accordance with the present invention, the battery is attached to the case of the sound generation. Therefore, the battery and the sound generator can be assembled in a small size. Since it is not necessary to manufacture a housing for mounting the battery, the manufacturing cost is reduced.

What is claimed is:

1. A sound generator for a portable device comprising;
a case having a circular recess in a top portion;
a sound generating device mounted in the case;
a battery inserted in the recess of the case;
terminals provided on an underside of the case;
a pair of contact plates, each of which is elastically in contact with a corresponding electrode of the battery;
each of the contact plates extending along a surface of the electrode of the battery, and extending downwardly along a side wall of the case, and being inwardly bent at a lower corner of the case and secured to a corresponding terminal, both of the contact plates elastically holding the battery in the circular recess.

2. The sound generator according to claim 1 wherein the sound generating device is a buzzer.

3. The sound generator according to claim 1 wherein the battery is a disc type battery, and has an upper electrode and lower electrode.

4. The sound generator according to claim 2 wherein the terminals comprises a pair of terminals for applying a voltage of the battery to a control circuit, and a pair of terminals for applying a voltage from the control circuit to the buzzer for operating it.

5. The sound generator according to claim 3 wherein the contact plate contacted with the upper electrode is made of a resilient metal plate.

6. The sound generator according to claim 5 wherein the battery is held by the contact plate engaged with the upper electrode.

7. The sound generator according to claim 6 wherein the contact plate holding the battery is offset.

8. The sound generator according to claim 6 wherein each of the terminals comprises a flat metal plate so as to be mounted on a printed circuit substrate.

* * * * *